United States Patent [19]

Kunz

[11] Patent Number: 5,370,354
[45] Date of Patent: Dec. 6, 1994

[54] HERMETIC SOLENOID OPERATED VALVE STRUCTURE AND METHOD OF MANUFACTURING THE SAME

[75] Inventor: Bernard L. Kunz, Madison, Ill.

[73] Assignee: Emerson Electric Co., St. Louis, Mo.

[21] Appl. No.: 221,477

[22] Filed: Apr. 1, 1994

[51] Int. Cl.$^5$ .............................................. F16K 31/06
[52] U.S. Cl. ........................... 251/30.02; 251/129.15; 251/366
[58] Field of Search ............. 251/30.01, 30.02, 129.15, 251/366, 367, 30.03, 30.04, 30.05

[56] References Cited

U.S. PATENT DOCUMENTS

| | | | |
|---|---|---|---|
| 2,946,551 | 7/1960 | Kovach | 251/367 X |
| 3,430,918 | 3/1969 | Kolze | 251/367 X |
| 4,452,424 | 6/1984 | Kawata | 251/129.15 |
| 4,597,558 | 7/1986 | Hafner et al. | 251/129.15 X |
| 5,188,339 | 2/1993 | Bartoschek et al. | 251/366 X |

*Primary Examiner*—Martin P. Schwadron
*Assistant Examiner*—Kevin L. Lee
*Attorney, Agent, or Firm*—Polster, Lieder, Woodruff & Lucchesi

[57] ABSTRACT

A hermetic solenoid valve structure and method of forming the same wherein the valve housing includes two sections of thinly formed flexible material are hermetically joined to provide two chambers of selected volume in which a ported piston valve assembly including two separate, relatively moveable piston members is disposed with a solenoid assembly surrounding the valve assembly to control fluid flow through the assembly.

16 Claims, 2 Drawing Sheets

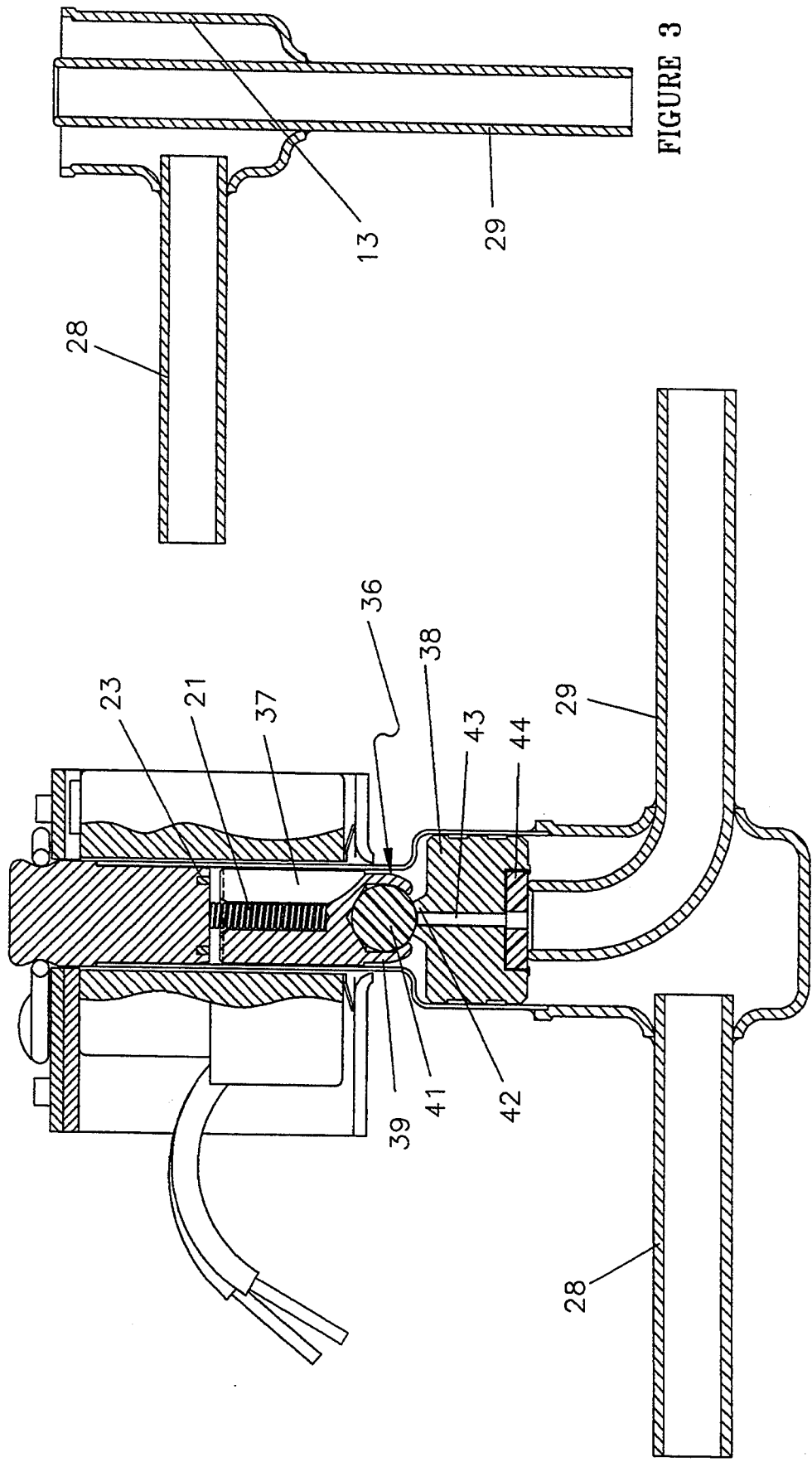

HERMETIC SOLENOID OPERATED VALVE STRUCTURE AND METHOD OF MANUFACTURING THE SAME

BACKGROUND OF THE INVENTION

The present invention relates to a unique solenoid operated valve structure and a method of making the same and more particularly to a solenoid valve structure which is hermetically sealed and which includes a valve housing that can be manufactured and assembled in a straight forward, economical manner from a comparatively inexpensive sheet like material with a minimum of fluid leakage.

Hermetically sealed, solenoid operated valve structure in the prior art, particularly in the refrigeration industry, has been comparatively difficult, requiring valve housing structure which includes costly body parts, which are milled and machined from solid metal, thus necessitating several take-apart, bolted or screwed gasket seals to provide a leak-free housing assembly which has occasioned frequent maintenance or replacement in order to minimize fluid leakage.

The present invention, recognizing the associated disadvantages of prior art solenoid operated valve structures which have required comparatively expensive operating parts including milled and machined valve body parts and numerous take-apart gasket members to reduce fluid leakage, provides a uniquely modified, solenoid operated valve which is straightforward and economical in manufacture and assembly, utilizing a minimum of parts, eliminating most, if not all of previously required gasket seals and yet substantially reducing fluid leakage, the unique hermetically sealed, solenoid structure of the present invention allowing ready, straightforward connection and replacement disconnection in a hermetically sealed fluid system with a minimum of operating steps. In addition, the valve structure of the present includes a novel valve stem and seat arrangement which minimizes valve wear, maximizes valve life and, at the same time, can be effectively utilized with various valve sizes and fluid capacities. Further, the present invention provides a long enduring arrangement which provides tighter sealing, reduces requirements for special valve seat parts, utilizing required conduit extremities for such purposes. Various other features of the present invention will become obvious to one skilled in the art upon reading the disclosure set forth herein.

BRIEF SUMMARY OF THE INVENTION

More particularly the present invention provides a hermetic solenoid valve structure for a variable fluid system comprising: a solenoid housing with a solenoid coil disposed therein, a valve housing, and a relatively moveable portable piston valve assembly disposed within the valve housing, the valve housing including a thinly formed, sheet-like assembly, enclosing tube first chamber, plugged at one end thereof, the enclosing tube first chamber being formed of thin non-magnetic sheet like material shaped to define the first chamber to accommodate a portion of the relatively movable piston valve assembly therein with the solenoid coil and solenoid housing surroundingly extending externally thereabout to control movement of the piston valve assembly, the valve housing further including a thinly formed, sheet-like second chamber defining a ported body portion to be in communication with the sheet-like enclosing tube defining the first chamber portion; and, fluid inlet and outlet conduits communicatively cooperative with the sheet-like valve housing to be communicatively connected to opposite sides of the relatively moveable ported piston assembly with the solenoid coil controlling the ported piston valve assembly to regulate fluid flow between the fluid inlet and outlet conduits. In addition, the present invention provides a novel ported valve stem structure including a spherical insertable valve stem and a novel conduit extremity valve seat. Further, the present invention provides a method of manufacturing a hermetic solenoid valve structure for a variable fluid system including a solenoid housing with a solenoid coil disposed therein, a valve housing and a moveable ported piston valve assembly disposed within the valve housing comprising: forming the valve housing from a selected comparatively thin, sheet-like, non-magnetic formable material to include a sheet-like enclosing tube member formed to define a first open-ended chamber having an open end upper and lower section with the lower section formed to have an outwardly extending skirt edge; further forming and including a sheet-like ported body member of cup-shaped with the upper end thereof sized to conform with the outwardly extending skirt edge of the sheet-like enclosing tube member; forming, a first piston member, sized to conform with the enclosing tube to be slidably disposed therein, the first piston member having a valve seat disposed at the lower extremity thereof; hermetically sealing a solenoid housing with an annular solenoid coil disposed therein to the enclosing tube member to surround and energize the first piston member slidably disposed within the sheet-like enclosing tube; forming a second ported piston member sized to conform with the lower section of the sheet-like enclosing tube to be disposed therein in sealed relation with the inner wall face of the sheet-like enclosing tube, the second ported piston member including a flow-through port therein aligned with the valve seat of the piston member; inserting a spring member into one end of said enclosing tube to engage with the end of the piston member opposite the valve seat; plugging the enclosed tube end with a plug member engaging the spring member; hermetically sealing the outwardly extending skirt edge of the sheet-like enclosing tube with the open edge of the sheet-like cup-shaped ported body member; and sealingly connecting fluid inlet and outlet conduits to the sheet-like body member to communicate with opposite sides of the ported piston member with the solenoid coil controlling moveable engagement of the piston members to control fluid flow between the fluid inlet and outlet conduits.

It is to be understood that various changes can be made in one or more of the several parts of the novel apparatus, such as parts configurations, and in one or more of the several steps of the novel method disclosed herein, such as step sequences, by one skilled in the art without departing from the scope or spirit of the present invention.

BRIEF DESCRIPTION OF THE DRAWINGS

Referring to the drawings which disclose one advantageous embodiment of the present invention and novel modifications thereto:

FIG. 2 is a partially broken away side view of another embodiment of the inventive solenoid operated valve structure; and, FIG. 3 is a schematic cross-sectional view of a further embodiment of a portion of a valve housing that can be utilized in the present invention.

DETAILED DESCRIPTION OF THE DRAWINGS

Figure 1:
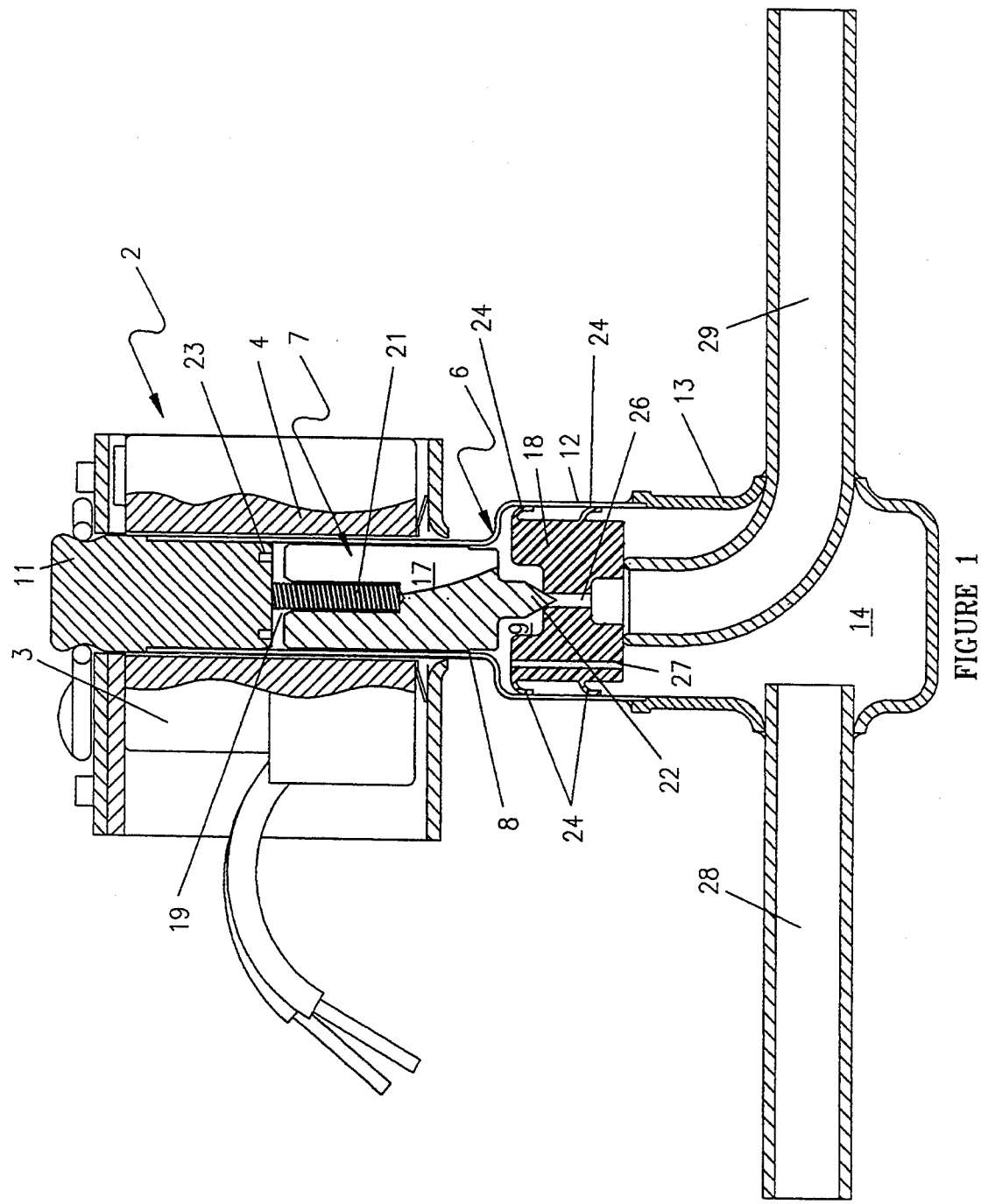
FIG. 1 is a partially broken away, side view of one embodiment of the inventive solenoid operated valve structure.

Referring to FIG. 1 of the drawings, the hermetic solenoid valve structure for a variable fluid system is broadly disclosed by reference numeral 2. This valve structure includes a solenoid housing 3 for an annular solenoid coil 4 disposed therein which coil 4 cooperatively surrounds and is hermetically sealed to a portion of a valve housing 6. Valve housing 6 has disposed therein a moveable ported piston valve assembly, broadly referred to by the reference numeral 7.

In accordance with the present invention valve housing 6 is formed in two parts from thin sheet-like stock which can be of metal such as stainless steel, brass or copper, and which, advantageously can be of readily workable non-magnetic stainless steel. The novel valve housing 6 includes a first section thinly drawn piston assembly enclosing tube 8 shaped in the forming process to define a first cylindrical chamber 9. Chamber 9 defined by enclosing tube 8 is shown in the drawings as plugged at the upper end thereof by a cylindrical, steel plug 11 and the enclosing tube 8 is outwardly flared at the opposite or lower end 12.

Valve housing 6 further includes a thinly formed, sheet-like ported body portion 13 which is shaped to define a second cylindrical chamber 14 to be in communication with cylindrical chamber 9 defined by enclosing tube 8. Ported body portion 13, including two spaced ports in the side wall thereof, can be stamped advantageously from a suitable metal sheet such as stainless steel into a cup shaped and hermetically welded to enclosing tube 8 along with edge extremity of outwardly flared portion 12 of enclosing tube 8. It is to be noted that the second cylindrical chamber 14 defined by these joined thin metal portions, as aforedescribed, can be selectively sized to be approximately twice as great as the first cylindrical chamber 9 defined by enclosing tube 8.

The moveable ported piston valve assembly, broadly referred to, as above, by reference numeral 7 is disposed within the enclosing tube first section 8 of valve housing 6, the valve housing 6 being formed as aforedescribed to include thin upper and lower parts 8 and 12 respectively, formed in accordance with the present invention by the two shaped and hermetically joined thin sheet metal blanks. In the novel embodiment of the invention disclosed in FIG. 1 of the drawings, the ported piston valve assembly 7 is comprised of two independently formed piston members 17 and 18. Piston member 17 advantageously can be formed from stainless steel to slidably serve as a plunger which is snugly yet slidably disposed within the upper portion or the first section of enclosing tube 8. Piston 17 is centrally recessed at the top extremity thereof so as to accommodate a helically coiled compression spring 21 which can be formed from any one of a number of suitable materials such as music wire or stainless steel. Spring 21 is so sized in length that the upper extremity thereof abuts against the plug 11 aforedescribed. Piston member 17 which is selectively and slidably actuated within enclosing tube 8 by annular solenoid coil 4 is protrudedly tapered at the lower or opposite end to provide valve seat 22. It is to be noted that plug 11 can be provide at its lower extremity with a shading band 23 of copper which is to be used for AC operation only.

The ported piston valve assembly of FIG. 1 as above-noted—further includes a second independently slidable piston 18. Piston 18, which advantageously can be formed from a suitable plastic material is sized to snugly and slidably engage against the outwardly flared wall of enclosing tube 8. Piston 18 can be formed to be provided with thin, flexible, spaced annular and peripheral seal members 24 extending therefrom to slidably engage above the joined wall of outwardly flared enclosing tube 8 and cup-shaped body portion 13. A flow-through port 26 is centrally disposed in the second, plastic piston member 18 to be in cooperative alignment with tapered valve seat 22 at the lower extremity of piston member 17 with the opening and closing of flow-through port 26 depending upon the solenoid controlled movement of upper, slidable piston member 17 of piston assembly 16.

It is to be noted that in addition to the controlled flow-through port 26 in piston 18, piston 18 is further provided with a bleed-through line 27 to accommodate or allow high pressure fluid to flow from one side of piston member 18 to the other.

To introduce and remove fluid from valve housing 6, fluid inlet conduit 28 and fluid outlet conduit 29 communicatively cooperate with the second chamber 14 principally defined by cup-shaped ported body portion 13 through the two spaced ports provided in the lower part of ported body portion 13. In the embodiment of FIG. 1, fluid from inlet conduit 28 under high pressure flows to opposite end faces of ported piston member 18 through bleed-through line 27. When solenoid controlled valve seat 22 is in "open" position or spaced from the upper extremity of flow-through port 26, fluid flows through port 26 into outlet conduit 29, the elbow-shaped extremity of which is engaged by the lower end face of plastic piston members 18 of the ported piston assembly 7.

In a further embodiment of the present invention and referring to FIG. 2 of the drawings, a ported piston valve assembly 36 is disclosed as including two piston member 37 and 38 disposed in a valve housing structure in a manner like that of FIG. 1. In this FIG. 2 embodiment of the invention, the upper piston member 37 is also recess formed at its lower end in a claw-like shape 39 to receive and floatingly retain a press-fit spherical ball 41 which engages a raised valve seat 42 at the upper part of lower piston 38. The floating, spherical ball 41 arrangement rotatingly serves to accommodate for valve seat wear. It is to be noted that, in addition to the press-fit, spherical, floating ball 41 engagement with the upper opening of a flow-through port 43 provided in lower piston 38, the lower face of lower piston 38 is provided with a recess for an inserted valve seat annular disk 44, which valve seat annular disk 44, like floating ball 41, can be of plastic or elastomer material, the valve seat 44 engaging with the upper elbowed extremity of outlet conduit 29. In this regard, it is to be noted that the selection of elastomeric material insures a tighter sealing and the selection of a harder plastic material insures a longer wear life.

Further, as can be seen in the schematic arrangement of FIG. 3, and as a further alternate arrangement, the outlet conduit 29 can be disposed in the lower fluid chamber 14 in a vertically aligned position to engage with the ported valve assembly, if so desired.

In accordance with still another feature of the present invention, the several method steps involved in forming a hermetic solenoid valve structure for a variable fluid system which system includes a solenoid housing with a solenoid coil disposed thereon, a valve housing and a moveable piston valve assembly disposed within the valve housing are unique in the valve manufacturing art, being heretofore unknown in such art to provide a straightforward and economical method of producing a light, low cost, efficiently operable valve structure which can be readily and economically assembled into a larger system.

Pursuant to the novel method, a valve housing is formed from a selected, thin, sheet-like non-magnetic formable material to include a sheet-like enclosing tube member formed by drawing or extruding and then flaring such enclosing tube at one end to provide a first open-ended cylindrical chamber having open-end upper and lower sections with the lower section formed to have a flared, outwardly extending skirt edge. A second sheet-like ported body member is then independently formed advantageously by stamping, to provide a cup-shape having two spaced lower ports with the upper end of such cup-shaped ported body member being sized to conform with the outwardly extending skirt edge of the sheet-like enclosing tube member. A piston member assembly is formed to include first and second separate pistons, the first being sized to conform with the enclosing tube upper section to be snugly yet slidably disposed therein and including a recess at the upper end to accommodate a compression spring and a valve seat at the lower end which can be formed as a tapered member or as a ball receiving claw member to floatingly receive a valve seat sphere which is press fit into the claw. The second piston member, advantageously of plastic or brass material, is formed to conform with the outwardly flared lower section of the enclosing tube with spaced annular sealing skirts extending from the periphery and is ported to include a peripherally spaced bleed-through conduit and a centrally disposed flow-through conduit, alignable with either the tapered valve seat or spherical ball seat, depending upon the formation contour of the first piston. A plug is then inserted into the upper or top end of the enclosing tube, the first piston with a compression spring inserted in the upper end recess is then slidably inserted into the first or upper section of the enclosing tube with the spring in abutting relation with the plug and the second piston is slidably inserted into the lower section of the enclosing tube with the valve seat of the first piston aligned with the central flow-through conduit of the second piston of the piston assembly. With the two pistons properly inserted, the upper edge of the cup-shaped ported body section is hermetically sealed, advantageously by welding, to the lower sections outwardly extending skirt edge of the enclosing tube. Once this has been accomplished, the solenoid coil housing is hermetically sealed to the enclosing tube with the coil therein surrounding the tube and, fluid inlet and outlet conduits are sealingly connected hermetically to the spaced ports of the cup-shaped ported body member with one of the conduit ends so positioned as to communicate with opposite end faces of said second piston member with the solenoid coil serving to control relative moveable engagement of the slidable piston members to control fluid flow from one end face of said second piston to the other end face and between the fluid inlet and outlet conduits sealed to the spaced ports of ported cup-shaped body member. It is to be noted, as can be seen in the embodiment of the invention shown in FIG. 2, and as above described, the lower section of the first or upper piston assembly can be formed with a spherically shaped recess to floatingly receive a spherical ball, advantageously of a suitable plastic or elastomeric material, which serves as a floating valve seat. The second or lower piston member can include an upper protruding taper to alignably engage with the floating ball. Further, the lower portion of the second piston can be formed with a recess to receive an annular valve seat disk surrounding the flow-through conduit, the disk advantageously being made of similar materials as the ball, such valve seat disk engaging with an extremity of the outlet conduit. It further is to be noted, in FIG. 3, that if so desired, the outlet conduit, instead of being in elbow form, can be of straightline form, similar to the inlet conduit with the extremity thereof aligned with the second ported piston of the piston assembly.

The invention claimed is:

1. A hermetic solenoid valve structure for a variable fluid system comprising:

a solenoid housing with a solenoid coil disposed therein, a valve housing, and a relatively moveable ported piston valve assembly disposed within said valve housing, said valve housing including a thinly formed, sheet-like enclosing tube first chamber, plugged at one end thereof, said enclosing tube first chamber being formed of thin, non-magnetic sheet-like material shaped to define said first chamber to accommodate a portion of said relatively moveable piston valve assembly therein with said solenoid coil and solenoid housing surroundingly extending externally thereabout to control movement of said piston valve assembly, said valve housing further including a thinly formed sheet-like second chamber defining a ported body portion to be in communication with said sheet-like enclosing tube defined first chamber portion; and, fluid inlet and outlet conduits communicatively cooperative with said sheet-like valve housing to be communicatively connected to opposite sides of said relatively moveable ported piston valve assembly with said solenoid coil controlling said ported piston valve assembly to control fluid flow between said fluid inlet and outlet conduits.

2. The valve structure of claim 1, wherein one of said fluid inlet and outlet conduits communicatively cooperative with said sheet-like valve housing has an extremity thereof extending into said valve housing and cooperating with said relatively moveable ported piston valve assembly to serve as a valve seat for said assembly.

3. The valve structure of claim 1, wherein said plugged sheet-like enclosing tube first chamber is shaped in the form of a cylinder to slidably accommodate a first cylindrical piston member of said piston valve assembly, the lower portion of said sheet-like enclosing tube being outwardly flared to be sealed to said thinly formed sheet-like second ported body portion to define a second cylindrical chamber, said second cylindrical chamber being of selected cross-sectional area greater than said first chamber to enhance fluid flow and to slidably accommodate a flow-through ported second cylindrical piston of said piston valve assembly cooperative with said first cylindrical piston of said assembly to maintain said ported second cylindrical piston in open and closed position.

4. The valve structure of claim 3, wherein said ported second cylindrical piston includes annular peripheral seal means positioned to engage in slidably sealed relation with the inner wall face of said second chamber.

5. The valve structure of claim 3, wherein said ported second cylindrical piston being is provided with a bleed hole to allow fluid bleeding from the high pressure side to the low pressure side of said piston assembly.

6. The valve structure of claim 3, wherein said first cylindrical piston has a tapered valve seat extending from the lower end thereof engageable with the floor through port of said flow-through ported second piston.

7. The valve structure of claim 3, wherein said first piston in said enclosing tube is spring-loaded.

8. The valve structure of claim 3, wherein said first cylindrical piston has a ball retaining claw-like recess formed in the lower end thereof to receive and floatingly retain a spherical ball shaped seat therein engageable with the flow-through port of said flow-through ported second piston.

9. A hermetic solenoid valve structure for a variable fluid system comprising:

a solenoid housing with a solenoid coil disposed therein, a valve housing, and a moveable ported piston valve assembly disposed within said valve housing, said valve housing including a thinly drawn non-magnetic sheet-like stainless steel enclosing tube shaped to define a first cylindrical chamber plugged at one end thereof with a cylindrical stainless steel plug and outwardly flared at the opposite end thereof, said first cylindrical chamber having disposed therein a first cylindrical slidably moveable piston member of stainless steel recessed at the top thereof to accommodate a helically coiled stainless steel spring abutting at one end thereof with said stainless steel plug and tapered at the opposite end thereof to provide a valve seat, with said solenoid housing and coil extending externally about said first chamber defining enclosing tube to control slidable movement of said first piston member, said valve housing further including a thinly drawn metallic sheet-like cup-shaped ported body portion welded along the cup opening to said outwardly flared sheet-like enclosing tube portion to define a second chamber, said cup-shaped second chamber being selectively sized to be approximately twice as great as said first defined chamber and having slidably disposed therein a portable flow-through plastic piston with spaced, thin annular, seal members extending peripherally therefrom to slidably engage above the joined walls of said outwardly flared enclosing tube and said ported body portion with said flow through portable second piston having the flow-through port thereof aligned with said tapered valve seat of said first piston to be opened and closed thereby, said second piston having a fluid bleed hole extending therethrough; and, fluid inlet and outlet conduits communicatively cooperative with said sheet-like defined second chamber to be connected to opposite faces of said second ported piston with said solenoid coil controlling movement of said first piston relative said second piston to control fluid flow through said flow-through port of said second piston and between said inlet and outlet conduits.

10. A method of manufacturing a hermetic solenoid valve structure for a variable fluid system including a solenoid housing with a solenoid coil disposed therein, a valve housing and a moveable ported piston valve assembly disposed with the valve housing comprising:

forming said valve housing from a selected thin sheet-like non-magnetic formable material to include a sheet-like enclosing tube member formed to define a first open ended chamber having an open end first upper section and a lower second section with the lower second section flared outwardly to have a flared outwardly extending skirt edge and further independently and separately forming a sheet-like ported body member of cup-shape having two spaced ports with the upper end thereof sized to conform with said outwardly extending skirt edge of said sheet-like enclosing tube member;

forming a piston assembly including first and second separate pistons with the first piston being sized to conform with the enclosing tube upper section to be snugly yet slidably disposed therein and including a recess at the upper end to accommodate a compression spring and a valve seat at the lower end and with the separate second piston being formed to conform with the outwardly flared second lower section of the tube and being ported to include a flow-through passage alignable with the valve seat in the lower part of said first piston; inserting a plug into the upper end of said enclosing tube first section; inserting a compression spring in said recess of said first piston and slidably inserting said first piston into said first section of the enclosing tube with said compression spring abutting said plug; slidably inserting said second piston into said second section of said enclosing tube with the valve seat of said first piston aligned with said central flow through conduit in said second piston; hermetically sealing said upper end of said separately formed ported body section to said outwardly flared edge of said lower section of said enclosing tube to define a second chamber; hermetically sealing said solenoid coil housing to said upper section of said enclosing tube with said solenoid coil surrounding said enclosing tube first chamber; sealingly connecting fluid inlet and outlet conduits to said spaced ports in said cup-shaped ported body member with one of the conduit ends positioned to communicate with opposite faces of said second piston member through said flow-through passage with the solenoid coil controlling relative moveable engagement of said first and second pistons to control fluid flow from one face to the other and between said fluid conduits.

11. The method of manufacturing the solenoid valve structure of claim 10, wherein said second ported piston member cooperating with said first piston member being formed as a second slidable ported piston formed to have an annular seal means in slidably sealed relation with the inner wall face of said enclosing tube.

12. The method of manufacturing the solenoid valve structure of claim 11, wherein said second slidable ported piston having a bleed-through passage formed therein.

13. The method of manufacturing the solenoid valve structure of claim 10, wherein said sheet-like enclosing tube and cup-shaped body member are stamp formed in cylindrical shape with said body member defining said second chamber with said lower section of said enclosing tube of selected larger volume than said upper section of said enclosing tube.

14. The method of manufacturing the solenoid valve structure of claim 10, wherein said piston member is formed at its lower extremity with a retaining recessed claw-like portion to receive and retain a rotatable spherical ball-like valve seat therein.

15. The method of manufacturing the solenoid valve structure of claim 10, wherein one of said fluid conduits is formed to include an extremity serving as a valve seat for said moveable ported piston valve assembly.

16. The method of manufacturing the solenoid valve structure of Claim 10, wherein said second piston is formed to include a recess therein surrounding said flow-through passage and inserting an annular valve seat disk therein cooperable with one end of a fluid conduit.

* * * * *